US010684119B2

(12) United States Patent
Sikora

(10) Patent No.: US 10,684,119 B2
(45) Date of Patent: Jun. 16, 2020

(54) DEVICE AND METHOD FOR MEASURING THE DIAMETER AND/OR THE WALL THICKNESS OF A STRAND

(71) Applicant: Sikora AG, Bremen (DE)

(72) Inventor: Harald Sikora, Bremen (DE)

(73) Assignee: Sikora AG, Bremen (DE)

( * ) Notice: Subject to any disclaimer, the term of this patent is extended or adjusted under 35 U.S.C. 154(b) by 129 days.

(21) Appl. No.: 15/555,640

(22) PCT Filed: Feb. 26, 2016

(86) PCT No.: PCT/EP2016/054162
§ 371 (c)(1),
(2) Date: Jan. 5, 2018

(87) PCT Pub. No.: WO2016/139155
PCT Pub. Date: Sep. 9, 2016

(65) Prior Publication Data
US 2018/0112973 A1    Apr. 26, 2018

(30) Foreign Application Priority Data

Mar. 3, 2015  (DE) .................... 10 2015 103 063
Sep. 25, 2015 (DE) .................... 10 2015 116 234

(51) Int. Cl.
*G01N 21/3581*   (2014.01)
*G01B 11/06*     (2006.01)
*G01J 5/10*      (2006.01)

(52) U.S. Cl.
CPC ............ *G01B 11/0625* (2013.01); *G01J 5/10* (2013.01); *G01N 21/3581* (2013.01)

(58) Field of Classification Search
CPC . G01B 11/0633; G01B 11/0625; G01B 11/06; G01B 11/2408; G01N 21/3581
See application file for complete search history.

(56) References Cited

U.S. PATENT DOCUMENTS 7,876,423 B1 * 1/2011 Roth ................. G01B 11/0625
356/27
7,898,668 B2 * 3/2011 Umetsu .................... G01J 3/02
250/336.1

(Continued)

FOREIGN PATENT DOCUMENTS

JP    2002243416 A    8/2002

OTHER PUBLICATIONS

Hauck, J., et al. "Terahertz inline wall thickness monitoring system for plastic pipe extrusion." AIP Conference Proceedings. vol. 1593. No. 1. AIP, 2014 (Year: 2014).*

*Primary Examiner* — Wyatt A Stoffa
(74) *Attorney, Agent, or Firm* — Young Basile Hanlon & MacFarlane, P.C.

(57) ABSTRACT

A device for measuring the diameter and/or the wall thickness of a strand that has a substantially circular cross-section and is guided through the device by guide means in the direction of its longitudinal axis includes at least one transmitter for transmitting terahertz radiation, at least one radiation optical system that conducts the terahertz radiation to a strand guided by the device, at least one reflector for the terahertz radiation arranged opposite a transmitter and behind the strand in the radiation direction of the terahertz radiation, at least one receiver for receiving the terahertz radiation reflected at the strand and/or the reflector, and an evaluation apparatus that determines the diameter and/or the wall thickness of the strand using the measuring signals received by the at least one receiver. A corresponding method is also described.

21 Claims, 2 Drawing Sheets

(56) References Cited

U.S. PATENT DOCUMENTS

| | | | |
|---|---|---|---|
| 7,933,027 B1 | 4/2011 | Roth | |
| 9,360,296 B2 * | 6/2016 | White | G01N 21/3586 |
| 9,417,181 B2 * | 8/2016 | King | G01N 21/3586 |
| 9,791,263 B2 * | 10/2017 | Hochrein | G01N 29/04 |
| 2004/0095147 A1 * | 5/2004 | Cole | G01N 21/3581 |
| | | | 324/629 |
| 2004/0113103 A1 * | 6/2004 | Zhilkov | H05H 7/04 |
| | | | 250/504 R |
| 2006/0043298 A1 * | 3/2006 | Kawase | G01N 21/3581 |
| | | | 250/339.06 |
| 2007/0228280 A1 * | 10/2007 | Mueller | G01J 9/04 |
| | | | 250/341.1 |
| 2007/0235658 A1 * | 10/2007 | Zimdars | G01J 3/42 |
| | | | 250/390.07 |
| 2009/0059205 A1 * | 3/2009 | Itsuji | G01N 21/3581 |
| | | | 356/51 |
| 2009/0225313 A1 | 9/2009 | Umetsu | |
| 2009/0290149 A1 * | 11/2009 | Roth | G01N 21/3581 |
| | | | 356/300 |
| 2010/0280779 A1 | 11/2010 | White et al. | |
| 2012/0217403 A1 * | 8/2012 | Sartorius | G01N 21/3581 |
| | | | 250/339.12 |
| 2012/0307258 A1 | 12/2012 | Koerner et al. | |
| 2014/0332687 A1 | 11/2014 | Yamana et al. | |
| 2015/0323452 A1 * | 11/2015 | King | G01N 21/3563 |
| | | | 250/341.1 |
| 2017/0023354 A1 * | 1/2017 | Stich | G01B 11/06 |
| 2017/0336323 A1 * | 11/2017 | Mann | G01N 17/006 |

* cited by examiner

DEVICE AND METHOD FOR MEASURING THE DIAMETER AND/OR THE WALL THICKNESS OF A STRAND

TECHNICAL FIELD

The disclosure relates to a device and method for measuring the diameter and/or wall thickness of a strand with a substantially circular cross-section.

BACKGROUND

Ultrasonic measuring devices are known for measuring strand-shaped products such as electrical cables, hoses or pipes. A disadvantage of ultrasonic measuring devices is the need to contact to the strand to be measured with a contact medium. The density, temperature and quality of the medium, generally water, strongly influences the measuring result. Moreover, measuring results from such ultrasonic measuring devices depend on the strand temperature, in particular the wall thickness to be measured. Furthermore, known ultrasonic measuring devices do not provide any information on the diameter or out-of-roundness of a strand. Foamed or partially-foamed products have an absorption that is too high for ultrasonic waves and can therefore not be measured with ultrasonic measuring instruments.

So-called terahertz measuring instruments are also known in which a transmitter transmits terahertz radiation at a frequency range of approximately 0.05 to 3 THz; this radiation is reflected by a product to be measured, and the reflected radiation is received by a suitable receiver. With the known terahertz measuring instruments, only distances or wall thicknesses of flat products such as plates are measured, however. The terahertz radiation is focused on the surface of the plate to be measured. Measuring reflection to determine the distance or wall thickness is then comparatively easy. If, however, diameters or wall thicknesses of cylindrical strand products, i.e., cables, pipes or hoses, are to be measured with such measuring instruments, it would be necessary to adjust to the sensor to optimally focus on the surface of the strand to be measured. This holds true in particular when the diameter of the strand to be measured changes. This is associated with significantly complex measurement. Another disadvantage is that for each radius of curvature of a strand to be measured, the algorithms for evaluating the measuring signals must be re-adapted. This is associated with significantly extensive evaluation. In particular with (partially) transparent strands, there is also the problem of evaluating radiation components that are reflected several times.

BRIEF SUMMARY

Proceeding from the outlined prior art, an object of the invention is to provide a device and method by means of which the diameter and/or the wall thickness of a strand with a substantially circular cross-section can be measured easily in terms of measuring and evaluation technique with minimal influences from external parameters such as temperature.

The invention achieves this object by a device for measuring the diameter and/or the wall thickness of a strand that has a substantially circular cross-section and is guided through the device by guide means in the direction of its longitudinal axis. The device can comprise at least one transmitter for transmitting terahertz radiation, wherein at least one radiation optical system is provided that conducts terahertz radiation emitted by the transmitter to a strand guided by the device, wherein a reflector for the terahertz radiation is arranged opposite at least one transmitter and behind the strand in the radiation direction of the terahertz radiation emitted by the at least one transmitter, furthermore comprising at least one receiver for receiving the terahertz radiation emitted by the at least one transmitter and reflected at the strand and/or the reflector, and comprising an evaluation apparatus that is designed to determine the diameter and/or the wall thickness of the strand using the measuring signals received by the at least one receiver.

Moreover, the invention achieves the object with a method for measuring the diameter and/or wall thickness of a strand with a substantially circular cross-section in which a strand is guided by the device in the direction of its longitudinal axis. The method can comprise at least one transmitter transmitting terahertz radiation, wherein the terahertz radiation transmitted by the at least one transmitter is directed toward a strand guided through the device by at least one radiation optical system, wherein the terahertz radiation transmitted by at least one transmitter is reflected by the strand and/or at least one reflector lying opposite the at least one transmitter and behind the strand in the direction of radiation of the emitted terahertz radiation, and is received by at least one receiver, and wherein the diameter and/or the wall thickness of the strand is determined using the measuring signals received by the at least one receiver.

The strand measured according to this disclosure is substantially cylindrical and is guided by the guide means through the device. In particular, there is a relative movement in the axial direction of the strand between the strand and the transmitter and receiver of the device. For example, the strand can be guided through the device, or respectively the transmitter and receiver, or respectively moved by the guide means, or respectively a suitable drive of the guide means, in the direction of its longitudinal axis. The guide means can be part of the device according to the invention or separate therefrom, for example a part of a larger system for producing and/or processing the strand. The transmitter and receiver, or respectively the radiation optical system, are in particular aligned so that the optical axis of the transmitter and receiver, or respectively radiation optical system, lies substantially perpendicular to the longitudinal axis of the strand. The terahertz radiation emitted by the transmitter is then directed substantially at a right angle toward the strand by the radiation optical system. The strand can be made of a plurality of wall sections. These wall sections can be designed substantially as a regular cylinder or respectively, a hollow regular cylinder. Individual or all wall sections can be (partially) transparent to the terahertz radiation.

The at least one transmitter transmits terahertz radiation, which is correspondingly received by the at least one receiver. A possible frequency range for the terahertz radiation transmitted by the at least one transmitter is 0.05 to 3 THz. The transmitter and receiver are connected to an evaluation apparatus, in particular by suitable lines. The evaluation apparatus can also control the at least one transmitter and/or the least one receiver. In particular, the evaluation apparatus can control the at least one transmitter for transmitting terahertz radiation. The evaluation apparatus thereby knows the starting time for any propagation time measurement. With reference to the time at which the receiver receives a reflected signal and transmits it to the evaluation apparatus, the propagation time of the terahertz radiation reflected at the strand to be measured and/or the reflector can be determined by the evaluation apparatus.

A reflector for the terahertz radiation is arranged opposite at least one transmitter and behind the strand in the radiation direction of the terahertz radiation emitted by the transmitter. The reflector can be a cylindrically curved reflector with a longitudinal axis that runs in the direction of the longitudinal axis of a strand guided through the device. The center of curvature of the reflector then coincides in particular with the center of curvature of the strand to be measured. The focal line of the hollow cylindrical reflector then coincides with the longitudinal axis of the strand and can coincide with the focal line of the terahertz radiation. A reflector amplifies the measuring signal because the signals guided back to the receiver by the reflector can also be used for evaluation. Moreover, the reflector allows improved discrimination of the different measuring signals received by the receiver or receivers, particularly in the event of multiple reflections. Accordingly, a reflector permits the separate evaluation of the front and rear side of a strand facing, or respectively facing away from the transmitter/receiver, and can accordingly prevent faults from multiple reflections. In particular, the reflector allows measurement by reflections of the terahertz radiation at boundary surfaces of the strand both on the path of the radiation from the transmitter to the reflector as well as on the return path of the radiation from the reflector to the receiver. Accordingly for example, propagation times can be compared of signals that on the one hand pass directly from the transmitter/receiver to the reflector and back to the transmitter/receiver, and that on the other hand pass from the transmitter/receiver directly to the reflector, then, coming from the reflector, are reflected by the back strand wall, or respectively the inner and outer boundary surfaces of the rear strand wall, and pass back to the reflector and are reflected again thereby back to the transmitter/receiver. From this difference in propagation time, the distance can be inferred between the rear strand wall and the reflector with its known position, or respectively the wall thickness of the rear strand wall facing the reflector, or respectively the diameter of the strand. The evaluation (also called evaluating) apparatus of the device can be correspondingly designed for this. The reflector then simulates another transmitter. With the assistance of the reflector, the side of a strand facing the reflector can hence also be reliably measured when the original received signal from the rear strand wall is disturbed by multiple reflections between the transmitter/receiver and the boundary surfaces of the strand facing the transmitter/receiver.

Multiple reflections that disturb the measuring results occur for example when the distance from the transmitter/receiver to the facing surface of the strand is the same as the diameter of the strand. If $s_1$ is the distance from the transmitter/receiver to the facing surface of the strand and d is the diameter of the strand, then:

$$4s_1 = 2(s_1 + d)$$

Radiation echoes enter the receiver from the rear wall of the strand facing away from the transmitter/receiver at the same time as radiation reflected twice between the transmitter/receiver and the surface of the strand facing the transmitter/receiver. This causes a disturbance of the measuring result. In contrast, disturbances from multiple reflections between the reflector and the surface of the strand facing the reflector do not occur with signals coming from the reflector given a strand diameter of d≠0. The same holds true for signals coming from the reflector with regard to any disturbances from multiple reflections within the strand. In the event that $d=s_1$, the position, or respectively the thickness of the rear strand wall facing the reflector, can then be measured in the above-explained manner in that the reflector is used in the explained manner as a simulation of another transmitter.

By (slightly) changing the value $s_1$, it is also possible to shift the influence of multiple reflections to other diameter values d and hence to a diameter range that is irrelevant to the respective application.

In addition, the reflector reliably shields high-frequency radiation and prevents high-frequency radiation from passing outside into the surroundings of the measuring device. Moreover with the assistance of the reflector, the propagation time of terahertz radiation in the device can be measured without the strand being guided through the device. This propagation time can be compared with the propagation time of the terahertz radiation in the device when the strand is being guided through the device. As explained below, the diameter and wall thickness can be determined in this manner independent of the properties of the strand material, and hence without knowledge of the precise properties of the strand material. The diffraction index and the absorption of the strand material can also be determined in this manner.

To the extent that the strand to be measured, or respectively its layers are (partially) permeable to the terahertz radiation, as for example is the case with plastic pipes or plastic hoses, the rear exterior of the strand facing away from the sensor can also be measured according to the invention because reflection of the terahertz radiation also occurs at this rear exterior. In this manner, a wall thickness measurement or diameter measurement of the strand is accordingly possible. In particular, (partial) reflections of the terahertz radiation can occur at the exterior of the strand facing the transmitter and receiver, at the rear exterior of the strand facing away from the transmitter and receiver, and at some or all of the boundary surfaces between different layers of the strand. For example, the diameter of the strand can be determined by evaluating the difference in propagation time between radiation reflected at the front exterior of the strand facing the transmitter/receiver and the radiation reflected at the rear exterior of the strand facing the transmitter/receiver. The wall thickness of a specific strand layer can be correspondingly determined by evaluating the difference in propagation time between the radiation reflected at the outer boundary service of the relevant strand layer facing the transmitter/receiver and the radiation reflected at the inner boundary surface of the relevant strand layer facing away from the transmitter/receiver.

Overall, according to the device and method described herein, there is less effort both in terms of measurement and in terms of evaluation while at the same time reliably measuring the diameter and/or the wall thickness of a strand with a substantially circular cross-section with minimum influences from external parameters such as temperature, etc.

According to one exemplary embodiment, a suitable radiation optical system comprising for example one or more suitable lenses can focus the terahertz radiation emitted by the at least one transmitter as a focal line on the (central) longitudinal axis, or respectively cylindrical axis of the strand to be measured. Viewed in a plane perpendicular to the longitudinal direction of the strand, the focus of the terahertz radiation emitted by the at least one transmitter then lies in the circle center of the strand, and not on the surface as in the prior art. Of course, the terahertz radiation reflected at the strand surfaces can again be directed by the at least one radiation optical system to the at least one receiver. The beam path of the terahertz radiation reflected by the strand toward the at least one receiver can be identical with the beam path from the at least one transmitter to the strand with the exception of the reversal in direction. Since the terahertz radiation is focused according to the invention on a focal line lying on the (central) longitudinal axis of the strand, the direction of all the beams emitted by the at least one transmitter, even when the strand diameter changes, is always perpendicular to the surface with a substantially circular cross-section, or respectively the circular boundary surfaces that also have a substantially circular cross-section, between different cylindrical, or respectively hollow cylindrical layers of the strand. Accordingly, algorithms that are known per se for measuring distance or wall thickness that are for example used for flat products such as plates can also be used for a cylindrical strand. In addition, the same evaluation algorithms can always be used for different, or respectively changing strand diameters. As long as the terahertz radiation remains focused on the longitudinal axis of the strand, the measuring device according to the invention does not have to be adjusted when the diameter of the strand changes.

As already mentioned, the optical axis of the at least one transmitter and the at least one receiver can lie substantially perpendicular to the longitudinal axis of the strand. Moreover, the marginal beams of the terahertz radiation focused by the at least one radiation optical system can form a wedge shape, wherein the side surfaces of the wedge shape bordering the sharp angle of the wedge shape can be mirror-symmetrical to a mid-plane (equatorial plane) running through the longitudinal axis of the strand guided through the device. The linear focus of the terahertz radiation on the strand can be achieved particularly easily when the at least one radiation optical system comprises at least one cylindrical lens. Of course, other antenna designs are conceivable as radiation optical systems that are different than the above-described lenses. For example, a combined biconvex/cylindrical lens can be used.

Alternatively to a linear focus, the radiation optical system can also, for example, focus the terahertz radiation in a fan shape (as tightly bundled as possible) on the strand. This offers a particularly simple and economical design. According to another alternative, the radiation optical system can direct the terahertz radiation parallel to the strand. This has the advantage that slight changes in position of the strand to be tested that are perpendicular to the direction of radiation have little influence on the measuring results.

According to another preferred embodiment, the at least one transmitter can emit modulated continuous wave terahertz radiation, in particular frequency-modulated continuous wave terahertz radiation. The frequency modulation can comprise a frequency burst or a plurality of frequency bursts. In particular, a so-called frequency sweep can occur in which a given frequency range is traversed once or several times.

It is, however, also possible for the at least one transmitter to emit pulse-modulated terahertz radiation, or phase-modulated terahertz radiation. For example, a so-called time domain reflectometry method or a frequency domain reflectometry method can be used. The transmission of a plurality of discrete frequencies instead of one frequency spectrum is also conceivable. Such methods are known per se.

The strand can for example be a (circle) cylindrical electrical cable with a (circle) cylindrical electrical conductor made of metal, possibly with a substantially hollow (circle) cylindrical shielding braid and a hollow (circle) cylindrical plastic sheath as the insulation. Likewise, the strand can be a tube, for example consisting of a plastic. By modulating the continuous wave radiation signal emitted by the at least one transmitter (such as FMCW), it is possible to very easily differentiate radiation reflected by different boundary surfaces of a cylindrical strand made of a plurality of layers in the receiver, or respectively in the evaluating apparatus, using the respective frequency of the received radiation. Accordingly, the distances of the transmitter, or respectively receiver to different boundary layers of the strand and hence the wall thickness of for example a plastic sheath of an electrical cable or the diameter of the strand can be reliably determined.

It can moreover be stipulated that the evaluation apparatus determines the diameter and/or the wall thickness of the strand using a measurement of the propagation time of the terahertz radiation emitted by the at least one transmitter.

A particularly simple design results when the at least one transmitter and the at least one receiver are formed by at least one terahertz transceiver. A transceiver is a combined transmitter and receiver. The transmitter and receiver are then basically arranged at the same location and always have the same distance from the strand, or respectively from the surfaces of the strand reflecting the terahertz radiation, so that evaluation is further simplified for example in a measurement of propagation time. Of course, however, it is also conceivable to arrange the transmitter and receiver not basically at the same location, but rather for example opposite each other.

According to another embodiment, a plurality of pairs of transmitters and receivers can be provided for transmitting, or respectively receiving terahertz radiation. Preferably at least two, more preferably at least four or more than four, such as eight pairs of transmitters and receivers, are provided wherein a radiation optical system is provided for each transmitter/receiver. The transmitters and receivers are arranged in pairs over the perimeter of the strand guided through the device, preferably along a circular path. One transmitter is always assigned to one receiver that receives the radiation of this transmitter. Each pair consisting of a transmitter and receiver can also be formed by a transceiver. The transceivers are then correspondingly arranged distributed over the perimeter of the strand to be measured.

It can then also be provided to design the evaluation apparatus to determine an out-of-roundness of the strand using the measuring signals received by the receivers, and/or to adjust one or more transmitters and receivers or radiation optical systems so that the terahertz radiation emitted by the transmitters remains linearly focused on the longitudinal axis of a strand guided through the device. The evaluating device can control suitable drives for adjusting the transmitter and receiver or radiation optical system based on the measuring results from the individual receivers. The evaluation apparatus can in particular be a combined evaluation and control apparatus. A corresponding control loop can be created in the control apparatus. Any out-of-roundness of the strand to be measured can also be determined by the evaluating apparatus by comparing the measuring results of individual receivers.

In the aforementioned embodiments, the distance between the transmitters/receivers and strand, and hence the wall thickness, diameter and/or the out-of-roundness of the strand, is accordingly measured from different directions without requiring an adjustment of the positions of the transmitters/receivers. This holds true in particular when at least two pairs of transmitters/receivers are used. Accordingly for each transmitter/receiver pair, two measuring sites can be provided at which the reflection of the terahertz radiation is measured, for example at the front and rear of a reflective surface or layer of the strand. In this case, the distances determined at three measuring sites define a circle. Out-of-roundness can then be ascertained by using a fourth measuring site. Focusing on the strand surface as provided in the prior art would contrastingly require an adjustment of the distance if the diameter of the strand changes. Of course, the position of the individual transmitters/receivers would then have to be measured with respect to their distance from the strand surface and possibly communicated to an evaluating apparatus if the diameter and out-of-roundness of the strand were also to be measured.

In particular instead of the aforementioned embodiment with a plurality of pairs of transmitters and receivers, it is also possible to rotate at least one pair consisting of a transmitter for transmitting terahertz radiation and a receiver for receiving the terahertz radiation transmitted by the receiver, for example two pairs of transmitters and receivers, during a measuring process about the longitudinal axis of the strand. The rotation is preferably along a circular path. The pair, or respectively pairs of transmitters and receivers can also be a transceiver. By rotating the transmitter/receiver pair about the strand, the presence of a plurality of pairs of transmitters and receivers can be simulated. In this manner, unevenness in the strand shape can be easily and reliably ascertained, such as so-called sagging as can arise while extruding the strand material.

This allows an evaluation to be carried out as described above in principle with regard to a plurality of pairs of transmitters and receivers. In particular, the evaluating apparatus can be designed to determine an out-of-roundness of the strand using the measuring signals received by the rotating receiver during its rotation, and/or to adjust the rotating transmitter/receiver or radiation optical system so that the terahertz radiation transmitted by the rotating transmitter always remains linearly focused on the longitudinal axis of a strand guided through the device. The evaluating device can also control suitable drives for adjusting the transmitter and receiver or radiation optical system based on the measuring results. The evaluation apparatus can also be a combined evaluation and control apparatus. A corresponding control loop can also be created in the control apparatus. Any out-of-roundness of the strand to be measured can also be determined by the evaluating apparatus by comparing the measuring results of the rotating receiver.

As already mentioned, the cylindrical strand measured according to the invention can be an electrical cable, pipe, preferably a plastic pipe, or a hose, preferably a plastic hose. A plastic-sheathed metal pipe for example is conceivable, or a plastic pipe with a metal layer for example as a vapor block. The pipe or tube can be a hollow cylinder. An electrical cable can in particular possess one or more preferably circular cylindrical metal conductors, possibly a hollow circular cylindrical metal shielding and one or more hollow circular cylindrical sheath layers (insulation layers), preferably made of plastic that surround the metal conductor, or respectively conductors.

More advantageously, a change in propagation time of the terahertz radiation emitted by the at least one transmitter and received by the at least one receiver after penetrating the strand caused by the material of the strand guided through the device can be taken into consideration when determining the diameter and/or wall thickness of the strand.

As mentioned, the strand guided through the device can be a hollow cylindrical strand made of a plastic such as a plastic pipe. Despite specific instructions to the manufacturer, plastic mixtures in particular vary significantly in practice. Consequently, the precise material composition of the strand is frequently unknown. Accordingly, some of the material constants relevant to the measuring method according to the invention are also unknown initially and must either be time-consumingly determined separately, or assumptions must be made in this regard that are not necessarily correct. Material constants are relevant in particular such as the refraction index, or respectively the dielectric constant, or respectively the absorption coefficient. These material constants directly influence the determination of the wall thickness according to the invention since the terahertz radiation has different propagation speeds in the material depending on the cited material constants. Accordingly, the propagation speed of the fundamental waves of the terahertz radiation is delayed differently depending on these material constants. If for example the propagation speed of the terahertz radiation in air is assumed when measuring terahertz radiation propagation time to determine the diameter or wall thickness, the result is incorrect, especially incorrect by the delay of the terahertz radiation caused by the strand material.

The aforementioned embodiment according to the invention makes it easily and reliably possible to eliminate such errors even when the material composition of the investigated strand is unknown. Preferably, the terahertz radiation emitted by the transmitter, preferably a transceiver, is reflected by a reflector after penetrating the strand and, after again penetrating the strand, is received by a receiver, preferably again by the transceiver. The propagation time measurement carried out when the strand is guided through the device can be easily compared with the corresponding propagation time measurement when the strand is not guided through the device. The change in the propagation speed of the terahertz radiation caused by the material of the strand can be inferred from the difference between these two propagation time measurements. Likewise, the distance between the transmitter and receiver, or respectively to the reflector, and hence the path traveled by the terahertz radiation during propagation time measurement can also be known. By using the known propagation speed of terahertz radiation in air, the change in propagation speed caused by the strand material can then be easily determined on this basis.

The thus determined propagation time change caused by the strand material can be included in the computation when determining the diameter and/or the wall thickness in order to precisely determine the diameter and/or wall thicknesses of the strand also without knowing the precise material composition. For example in determining the diameter, it is only necessary to subtract the change in propagation time determined as explained above and caused by the strand material from the measured propagation time difference between terahertz radiation reflected by the front side and back side of the strand. This is likewise possible when determining the wall thickness of a tubular strand by proportionately including the runtime change caused by the two walls penetrated by the terahertz radiation in computation. In this embodiment, the influence of the strand material on the propagation speed of the terahertz radiation is eliminated in measuring and calculating.

It is for example possible to determine the diameter D of the strand according to the following formula:

$$D = \tfrac{1}{2}(\Delta T_D - \Delta T_R)c$$

The variable $\Delta T_D$ is a difference in propagation time between terahertz radiation reflected from the outer boundary surface of the strand facing the at least one receiver and from the outer boundary surface of the strand facing away from the at least one receiver.

The variable $\Delta T_R$ is a change in propagation time of the terahertz radiation caused by the material of the strand guided through the device emitted by the at least one transmitter and received by the at least one receiver after penetrating the strand.

The constant c is a propagation speed of the terahertz radiation in air.

Moreover it is possible to determine the wall thickness $W_{d1}$ of the wall facing the at least one receiver, or respectively the wall section of the strand and/or the wall thickness $W_{d2}$ of the wall facing away from the at least one receiver, or respectively the wall section of the strand, according to the following formulas:

$$W_{d1} = \frac{1}{2}\left(\Delta T_{wd1} - \frac{\Delta T_R \times \Delta T_{wd1}}{\Delta T_{wd1} + \Delta T_{wd2}}\right)c$$

$$W_{d2} = \frac{1}{2}\left(\Delta T_{wd2} - \frac{\Delta T_R \times \Delta T_{wd2}}{\Delta T_{wd2} + \Delta T_{wd1}}\right)c$$

The variable $\Delta T_{wd1}$ is a difference in propagation time between terahertz radiation reflected from the outer boundary surface facing the at least one receiver and from the inner boundary surface facing away from the at least one receiver of the wall of the strand facing the at least one receiver.

The variable $\Delta T_{wd2}$ is a difference in propagation time between terahertz radiation reflected from the inner boundary surface facing the at least one receiver and from the outer boundary surface facing the at least one receiver of the wall of the strand facing the at least one receiver.

The variable $\Delta T_R$ is a change in propagation time of the terahertz radiation caused by the material of the strand guided through the device emitted by the at least one transmitter and received by the at least one receiver after penetrating the strand.

The constant c is a propagation speed of the terahertz radiation in air.

The material constants of the strand caused by this change, such as the refraction index and/or the dielectric constant, can be inferred from the ascertained change in propagation speed. Likewise, the absorption coefficients and hence the damping of the strand can be inferred in this manner. This can also increase the evaluation precision of beams reflected several times from optical boundary surfaces of the strand.

The device according to the invention is in particular designed for carrying out the method according to the invention. The method according to the invention can in particular be performed by using the device according to the invention.

Exemplary embodiments of the invention are explained in greater detail below with reference to figures.

BRIEF DESCRIPTION OF THE DRAWING

The same reference numbers refer to the same objects in the figures unless indicated otherwise.

DETAILED DESCRIPTION

Figure 1:
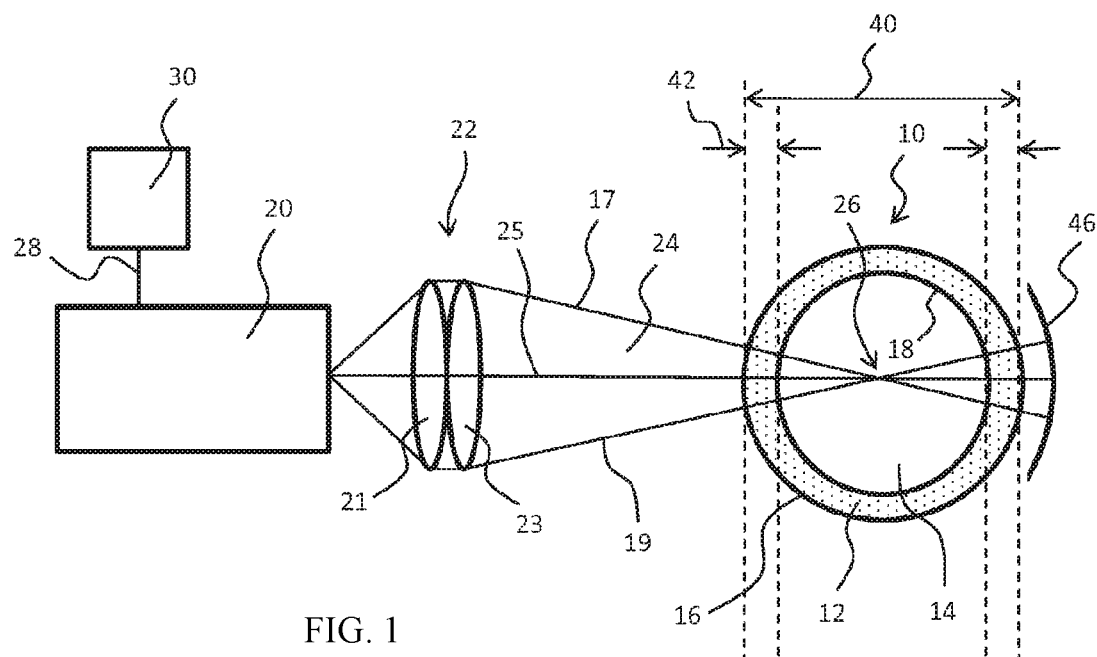
FIG. 1 is a first view of a device according to the invention for measuring a first strand.
Figure 2:
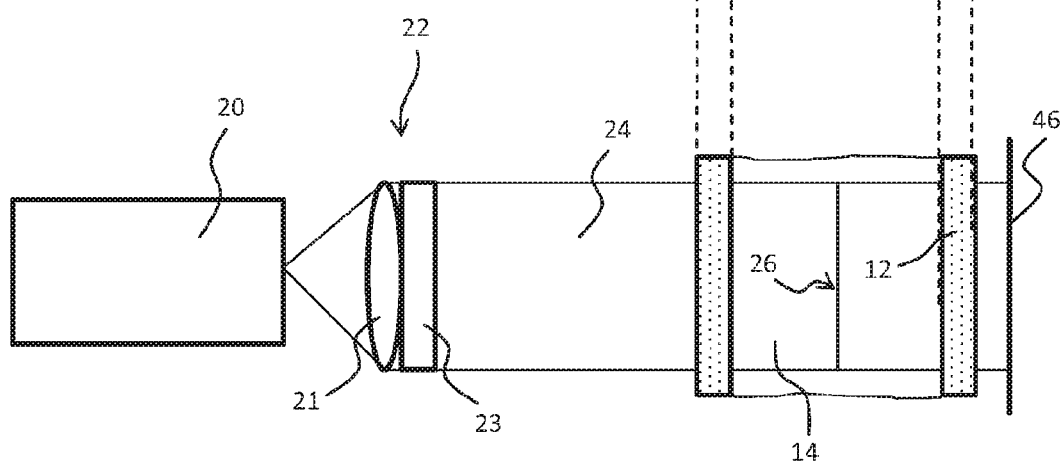
FIG. 2 is a second view of the device according to the invention from FIG. 1.

FIG. 1 shows a device according to the invention and a measuring arrangement in a vertical sectional view. FIG. 2 shows the device and a measuring arrangement from FIG. 1 in a horizontal sectional view. In the exemplary embodiment shown in FIGS. 1 and 2, a circular cylindrical strand 10 is conveyed through the device by a suitable guide along the central longitudinal axis (cylindrical axis) of the strand 10 extending vertically into the plane of the drawing in FIG. 1 and extending from bottom to top in FIG. 2. The strand 10 shown in FIGS. 1 and 2 is for example a plastic pipe with a hollow cylindrical wall 12 made of plastic that delimits a circular cylindrical hollow space 14. In the cross-sectional view shown in FIG. 1, it can be easily discerned that the strand 10 has a circular cross-section. In particular, the wall 12 of the strand 10 possesses an outer surface 16 with a circular cross-section and an inner surface 18 also with a circular cross-section that delimits the hollow space 14.

The device according to the invention shown in FIGS. 1 and 2 comprises a transmitter for emitting terahertz radiation and a receiver for receiving the terahertz radiation emitted by the transmitter, wherein the transmitter and receiver are formed by a terahertz transceiver 20 in the depicted example. Of course, spatially separate, e.g. opposing, transmitters and receivers could also be provided. Reference sign 22 schematically represents a radiation optical system, in the present case comprising a biconvex lens 21 and a cylindrical lens 23 for terahertz radiation. Of course, other radiation optical systems are also conceivable. For example, a combined biconvex/cylindrical lens could be used. The radiation optical system 22 linearly focuses the terahertz radiation 24 emitted by the transmitter so that the linear focus 26 of the terahertz radiation 24 coincides with the central longitudinal axis of the strand 10, i.e., in the midpoint of the circular strand 10 with a circular cross-section in the cross-sectional view in FIG. 1. The marginal rays of the terahertz radiation 24 focused by the radiation optical system 22 form a wedge shape as can be seen from a comparison of FIG. 1 with FIG. 2. The side surfaces 17 and 19 of the wedge shape shown in FIG. 1 are mirror-symmetrical to a middle plane (equatorial plane) running through the longitudinal axis of the strand 10 guided through the device. Moreover, it is discernible in FIGS. 1 and 2 that the optical axis 25 of the optical system formed by the transceiver 20 and the radiation optical system 22 is perpendicular to the longitudinal axis of the strand 10. The terahertz radiation 24 emitted by the transceiver 20 is accordingly directed by the radiation optical system 22 perpendicular to the longitudinal axis of the strand 10. The transmitter and receiver, or respectively the transceiver 20, are furthermore connected by a line 28 to an evaluating and control apparatus 30 (also called an evaluation apparatus herein).

A cylindrically curved reflector 46 for terahertz radiation has a longitudinal axis that runs in the direction of the longitudinal axis of the strand 10 guided through the device. The curvature midpoint of the reflector 46 to be measured coincides with the curvature midpoint of the strand 10 to be measured so that the focal line of the cylindrical reflector 46 coincides with the longitudinal axis of the strand 10. The reflector 46 amplifies the measuring signal and allows improved discrimination of the different measuring signals received by the receiver.

A method according to the invention performed with the device depicted in FIG. 1 and FIG. 2 works as follows. By the line 28, the evaluation and control apparatus 30 controls the transmitter of the transceiver 20 emitting terahertz radiation 24. In the portrayed example, the transmitter of the transceiver 20 emits frequency-modulated continuous wave terahertz radiation. In particular, one or more frequency bursts are traversed. Of course, it is also possible for the transmitter of the transceiver 20 to emit otherwise modulated terahertz radiation, such as pulse-modulated terahertz radiation or phase-modulated terahertz radiation. The terahertz radiation 24 is focused in a perpendicular direction and linearly on the central longitudinal axis of the strand 10 by the radiation optical system 22 as shown in FIGS. 1 and 2 while the strand 10 is being conveyed along its longitudinal axis through the device. The terahertz radiation 24 is first partially reflected from the outside 16 of the wall 12 facing the transmitter and receiver. The wall 12 is partially permeable to terahertz radiation, wherein the component of radiation passing through the outside 16 is then subsequently partially reflected by the inner surface 18 of the wall 12 before the remaining component of radiation enters the hollow space 14. The component of radiation entering the hollow space 14 is then subsequently partially reflected from the side of the inner surface 18 the wall 12 opposite the entrance into the hollow space, and the component of radiation entering the wall 12 is then partially reflected from the outer surface 16 of the wall 12 facing away from the transmitter and receiver.

All of the partially reflected radiation components return to the receiver of the transceiver 20 through the radiation optical system 22 and are received thereby in the form of measuring signals. The beam path of the terahertz radiation coming from the strand 10 back to the receiver of the transceiver 20 is identical (in the reverse direction) to the beam path from the transmitter of the transceiver 20 to the strand 10. Due to the frequency modulation of the continuous wave terahertz radiation emitted by the transmitter, the evaluating and control apparatus 30 can use the frequency of the measuring signals received by the receiver to distinguish which partially reflected radiation component it is. For example, the distances of the transceiver 20 to all the boundary surfaces partially reflecting the terahertz radiation can be determined by corresponding measurements of propagation time. From this data, the evaluating and control apparatus 30 can for example determine the outer diameter and the inner diameter of the wall 12 of the strand 10 and thereby the wall thickness of the wall 12. The outer diameter is shown in the figures as an example with reference sign 40 and the wall thickness with reference sign 42.

Due to the linear focus 26 of the terahertz radiation 24 on the central longitudinal axis of the strand 10, all of the beams emitted by the transmitter and focused by the radiation optical system 22 are perpendicular to the boundary surfaces with a circular cross-section. The measuring method described herein is accordingly independent of a change in diameter of the strand 10, or respectively individual boundary surfaces of the strand 10. It only has to be ensured that the linear focus 26 remains in the midpoint of the boundary surfaces with a circular cross-section. Furthermore, evaluation algorithms known from the measurement of flat panels can thereby be used for the respective measurement of distance.

Figure 3:
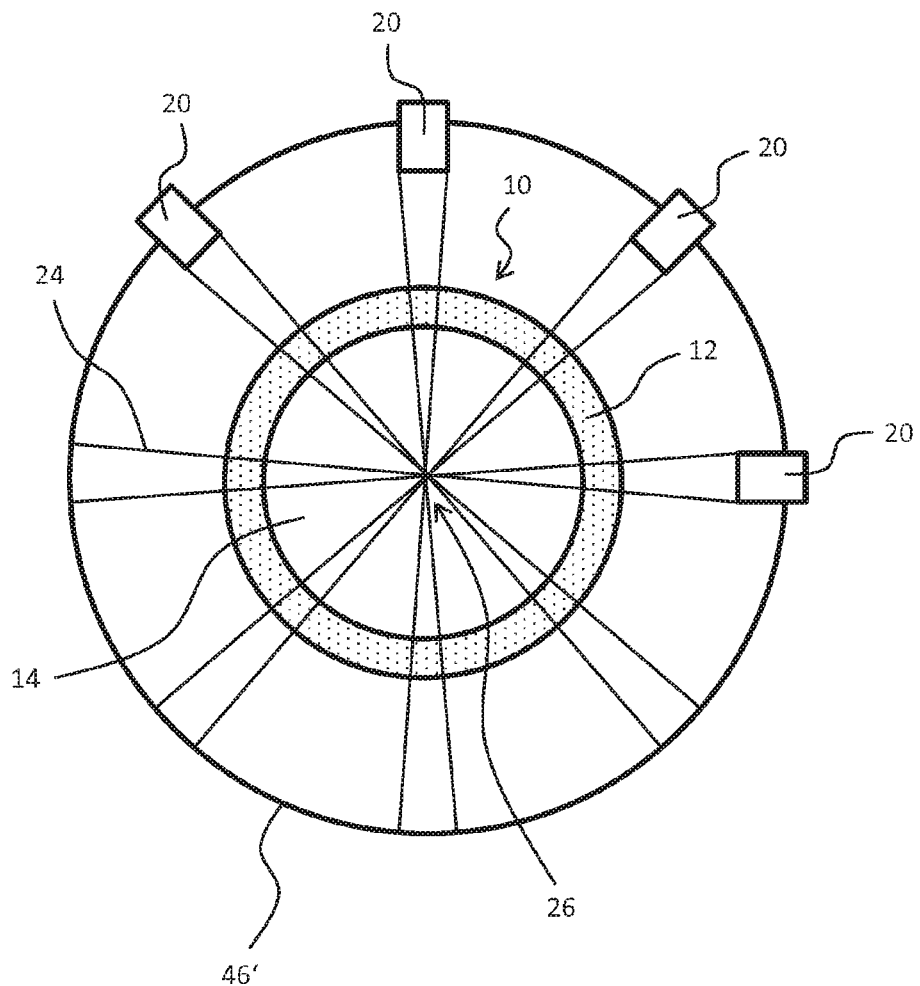
FIG. 3 is another exemplary embodiment of a device according to the invention for measuring a strand.

Moreover, with the design shown in FIGS. 1 to 3, a change in the propagation time of the terahertz radiation emitted by the transceiver 20 and received by the transceiver 20 after penetrating the strand 10 and being reflected by the reflector 46 caused by the material of the strand 10 guided through the device can be considered when determining the diameter and/or the wall thicknesses of the strand 10 as explained above.

This will be explained below using an example.

The following holds true for the propagation time $T_R$ of the terahertz radiation from the transceiver 20 to the opposing reflector 46 and back without strand material in the radiation path lengthening the propagation time:

$$T_R = \frac{2s}{c}$$

The variable s is a distance of the transceiver 20 to the reflector 46.

The constant c is a propagation speed of the terahertz radiation without strand material, for example about $3 \times 10^8$ m/s (i.e., the propagation speed of the terahertz radiation in air).

If contrastingly a tubular strand 10 is between the transceiver 20 and reflector 46, then the propagation time $T_R$ of the radiation penetrating the strand 10 on the way from the transceiver 20 to the reflector 46 and back is lengthened by a change/difference in the propagation time $(\Delta T_R)$ because the propagation speed is reduced as explained depending on the properties of the material while penetrating the wall 12.

To calculate the wall thicknesses $W_{d1}$ (thickness of the front wall 12 facing the transceiver 20, or respectively wall section 12 of the strand 10) and $W_{d2}$ (thickness of the rear wall 12 facing away from the transceiver 20, or respectively wall section 12 of the strand 10), the difference in propagation time $\Delta T W_{d1}$ between terahertz radiation reflected by the outer boundary surface facing the transceiver 20 and by the inner boundary surface of the front wall 12 of the strand 10 facing away from the transceiver is determined, and the difference in propagation time $\Delta T W_{d2}$ between terahertz radiation reflected by the inner boundary surface facing the transceiver 20 and by the outer boundary surface of the rear wall 12 of the strand 10 facing away from the transceiver 20 is determined. These differences in propagation time $\Delta T W_{d1}$ and $\Delta T W_{d2}$ are first multiplied by the half of the propagation speed c of the terahertz radiation (in air) without a strand to calculate the wall thicknesses $W_{d1}$ and $W_{d2}$.

Given the material-dependent low propagation speed of the terahertz radiation in the wall sections 12 of the strand 10, excessive wall thickness values would thereby result. These wall thickness values may be corrected as follows, given awareness of the change in propagation time $\Delta T_R$ caused by the strand material:

$$W_{d1} + W_{d2} = \tfrac{1}{2}(\Delta T_{wd1} + \Delta T_{wd2} - \Delta T_R)c$$

The increase in propagation time must be correspondingly proportionately deducted for the individual wall thicknesses. The following consequently results for the individual wall thicknesses:

$$W_{d1} = \frac{1}{2}\left(\Delta T_{wd1} - \frac{\Delta T_R \times \Delta T_{wd1}}{\Delta T_{wd1} + \Delta T_{wd2}}\right)c$$

$$W_{d2} = \frac{1}{2}\left(\Delta T_{wd2} - \frac{\Delta T_R \times \Delta T_{wd2}}{\Delta T_{wd2} + \Delta T_{wd1}}\right)c$$

Correspondingly, the change in propagation time $\Delta T_R$ caused by the strand material can be considered when determining the diameter of the strand 10. To determine the diameter, the difference in propagation time $(\Delta T_D)$ is determined between terahertz radiation reflected by the outer (front) boundary surface of the front wall 12 facing the transceiver 20 and the outer (rear) boundary surface of the rear wall 12 of the strand 10 facing away from the transceiver 20. The diameter D corrected by the propagation time change $\Delta T_R$ then results as follows:

$$D = \frac{1}{2}(\Delta T_D - \Delta T_R)c$$

In the exemplary embodiment depicted in FIG. 3, a plurality (four in the present case) of pairs of transmitters and receivers are provided, in the form of a transceiver 20 in the present case. The transceivers 20 are arranged distributed along a circular path over the circumference of the strand 10. Of course, spatially separate, e.g. opposing, transmitters and receivers could also be provided. A circular cylindrical reflector 46' can be provided along this circular path. A radiation optical system (not shown in FIG. 3) is provided that linearly focuses the terahertz radiation emitted by the respective transmitter as explained with reference to FIGS. 1 and 2 in a perpendicular direction on the central longitudinal axis of the strand 10. All of these transceivers 20 can then be suitably connected to an evaluating and control apparatus 30 (not shown in FIG. 3). It is also conceivable for them to each have their own evaluating and control apparatus 30, wherein these evaluating and control apparatuses can then be connected to each other. From the measured data of the different transmitter/receiver pairs, e.g., an out-of-roundness of the strand 10, or respectively individual layers of the strand 10, can be determined. Given a plurality of pairs of transmitters and receivers, it is also possible to control the transceivers 20 and/or the radiation optical systems by the evaluating and control apparatus(es) so that updating. The updating ensures that the linear focus 26 of the terahertz radiation emitted by the transmitters always remains on the central longitudinal axis of the strand 10.

Although a linear focus of the terahertz radiation on the central longitudinal axis of the strand 10 is described in the exemplary embodiments explained with reference to the figures, other beam paths would also be conceivable such as a (very tightly bundled) fan shaped focus on the strand, or a parallel path of the terahertz radiation toward the strand.

The invention claimed is:

1. A device for measuring at least one of a diameter or a wall thickness of a strand that has a substantially circular cross-section and is guided through the device in a direction of a longitudinal axis of the strand, the device comprising:
a transmitter for transmitting terahertz radiation;
a radiation optical system that directs the terahertz radiation emitted by the transmitter toward the strand;
a reflector arranged opposite a transmitter and behind the strand in a radiation direction of the terahertz radiation emitted by the transmitter;
a receiver for receiving measuring signals comprising the terahertz radiation emitted by the transmitter and reflected by at least one of the strand or the reflector; and
a computer that determines the at least one of the diameter or the wall thickness of the strand using the measuring signals received by the receiver, wherein the radiation optical system linearly focuses the terahertz radiation emitted by the transmitter such that a linear focus coincides with the longitudinal axis of the strand.

2. The device according to claim 1, wherein marginal beams of the terahertz radiation focused by the radiation optical system forms a wedge shape, side surfaces of the wedge shape are mirror-symmetrical to a mid-plane running through the longitudinal axis of the strand.

3. The device according to claim 1, wherein the transmitter emits at least one of modulated continuous wave terahertz radiation, frequency-modulated continuous wave terahertz radiation, pulse-modulated terahertz radiation, or phase-modulated terahertz radiation.

4. The device according to claim 1, wherein the computer determines the at least one of the diameter or the wall thickness of the strand using a propagation time measurement of the terahertz radiation emitted by the transmitter and received by the receiver.

5. The device according to claim 1, wherein the transmitter and the receiver are formed by a terahertz transceiver.

6. The device according to claim 1, wherein the transmitter and the receiver comprise a plurality of pairs of transmitters and receivers, the radiation optical system comprises a respective radiation optical system for each transmitter, and wherein the plurality of pairs of transmitters and receivers are arranged in pairs distributed over a perimeter of the strand.

7. The device according to claim 6, wherein the computer at least one of determines an out-of-roundness of the strand using measuring signals received by the receivers, or adjusts one or more of the transmitters and the receivers or the radiation optical systems so that the terahertz radiation remains linearly focused on the longitudinal axis of the strand.

8. The device according to claim 1, the transmitter and the receiver form a pair rotatable by a rotating apparatus about the longitudinal axis of the strand during a measuring process.

9. The device according to claim 1, wherein the reflector is cylindrically curved with a longitudinal axis that runs in a direction of the longitudinal axis of the strand.

10. The device according to claim 1, wherein the computer considers a change in propagation time of the terahertz radiation emitted by the transmitter and received by the receiver after penetrating the strand, said change being caused by a material of the strand guided through the device when determining the at least one of the diameter or the wall thickness of the strand.

11. The device according to claim 10, wherein the computer determines the diameter D of the strand in accordance with the following formula:

$$D = \frac{1}{2}(\Delta T_D - \Delta T_R)c$$

wherein:
$\Delta T_D$ is the difference in propagation time between the terahertz radiation reflected from an outer boundary surface of the strand facing the receiver and from an outer boundary surface of the strand facing away from the receiver,
$\Delta T_R$ is a change in propagation time of the terahertz radiation that is emitted by the transmitter and received by the receiver after penetrating the strand, the change caused by a material of the strand, and
c is a speed of the terahertz radiation in air.

12. A device for measuring at least one of a diameter or a wall thickness of a strand that has a substantially circular cross-section and is guided through the device in a direction of a longitudinal axis of the strand, the device comprising:
a transmitter for transmitting terahertz radiation;
a radiation optical system that directs the terahertz radiation emitted by the transmitter toward the strand;
a reflector arranged opposite a transmitter and behind the strand in a radiation direction of the terahertz radiation emitted by the transmitter;

a receiver for receiving measuring signals comprising the terahertz radiation emitted by the transmitter and reflected by at least one of the strand or the reflector; and a computer that determines the at least one of the diameter or the wall thickness of the strand using the measuring signals received by the receiver, wherein the computer determines at least one of the wall thickness $W_{d1}$ of a wall of the strand facing the receiver in accordance with the following formula:

$$W_{d1} = \frac{1}{2}\left(\Delta T_{wd1} - \frac{\Delta T_R \times \Delta T_{wd1}}{\Delta T_{wd1} + \Delta T_{wd2}}\right)c,$$

or the wall thickness $W_{d2}$ of a wall of the strand facing away from the receiver, in accordance with the following formula:

$$W_{d2} = \frac{1}{2}\left(\Delta T_{wd2} - \frac{\Delta T_R \times \Delta T_{wd2}}{\Delta T_{wd2} + \Delta T_{wd1}}\right)c$$

wherein:

$\Delta T_{wd1}$ is a difference in propagation time between the terahertz radiation reflected from an outer boundary surface of the wall of the strand facing the receiver and from an inner boundary surface of the wall of the strand facing the receiver, $\Delta T_{wd2}$ is a difference in propagation time between the terahertz radiation reflected from an inner boundary surface of the wall of the strand facing away from the receiver and from an outer boundary surface of the wall of the strand facing away from the receiver, $\Delta T_R$ is a change in propagation time of the terahertz radiation emitted by the transmitter and received by the receiver after penetrating the strand, the change caused by a material of the strand, and c is a propagation speed of the terahertz radiation in air.

13. A method for measuring a wall thickness of a strand with a substantially circular cross-section in which the strand is guided through a measuring device in a direction of a longitudinal axis of the strand, the method comprising:

transmitting terahertz radiation by a transmitter;

directing the terahertz radiation transmitted by the transmitter toward the strand by a radiation optical system, wherein the terahertz radiation transmitted by the transmitter is reflected by at least one of the strand or a reflector lying opposite the transmitter and behind the strand in a radiation direction of the terahertz radiation emitted by the transmitter;

receiving, by a receiver, measuring signals comprising the terahertz radiation emitted by the transmitter and reflected by the at least one of the strand or the reflector; and determining, by a computer, the wall thickness of the strand using the measuring signals received by the receiver, wherein determining the wall thickness of the strand using the measuring signals comprises:

determining the wall thickness of a wall of the strand facing the receiver and determining the wall thickness of a wall of the strand facing away from the receiver using a proportional change in propagation time of the terahertz radiation emitted by the transmitter and received by the receiver after penetrating the wall of the strand facing the receiver and the wall of the strand facing away from the receiver, said proportional change being caused by a material of the strand guided through the measuring device.

14. The method according to claim 13, wherein the radiation optical system linearly focuses the terahertz radiation emitted by the transmitter such that a linear focus coincides with the longitudinal axis of the strand.

15. The method according to claim 14, wherein marginal beams of the terahertz radiation focused by the radiation optical system form a wedge shape, and side surfaces of the wedge shape are mirror-symmetrical to a mid-plane running through the longitudinal axis of the strand.

16. The method according to claim 13, wherein the transmitter emits at least one of modulated continuous wave terahertz radiation, frequency-modulated continuous wave terahertz radiation, pulse-modulated terahertz radiation, or phase-modulated terahertz radiation.

17. The method according to claim 13, wherein transmitting the terahertz radiation by the transmitter comprises emitting, by a plurality of transmitters arranged distributed over a perimeter of the strand, the terahertz radiation, and receiving, by the receiver, the measuring signals comprises receiving the terahertz radiation emitted by the plurality of transmitters is received by a plurality of receivers that are associated with a respective transmitter as a pair, and are also arranged distributed over the perimeter of the strand.

18. The method according to claim 17, further comprising:

determining an out-of-roundness of the strand using the measuring signals; and adjusting at least one of a transmitter and receiver pair or the radiation optical system so that the terahertz radiation emitted by the plurality of transmitters remains linearly focused on the longitudinal axis of the strand.

19. The method according to claim 13, further comprising:

rotating a pair formed of the transmitter and the receiver along a circular path about the longitudinal axis of the strand during a measuring process.

20. The method according to claim 13, further comprising:

determining, by the computer, a diameter D of the strand in accordance with the following formula:

$$D = \frac{1}{2}(\Delta T_D - \Delta T_R)c$$

wherein:

$\Delta T_D$ is a difference in propagation time between the terahertz radiation reflected from an outer boundary surface of the strand facing the receiver and from an outer boundary surface of the strand facing away from the receiver, $\Delta T_R$ is a change in propagation time of the terahertz radiation emitted by the transmitter and received by the receiver after penetrating the strand, the change in propagation time caused by a material of the strand, and c is a propagation speed of the terahertz radiation in air.

21. The method according to claim 13, wherein determining, by the computer, the wall thickness of the strand comprises determining at least one of the wall thickness $W_{d1}$ of the wall of the strand facing the receiver in accordance with the following formula:

$$W_{d1} = \frac{1}{2}\left(\Delta T_{wd1} - \frac{\Delta T_R \times \Delta T_{wd1}}{\Delta T_{wd1} + \Delta T_{wd2}}\right)c,$$

or
the wall thickness $W_{d2}$ of the wall of the strand facing away from the receiver, in accordance with the following formula:

$$W_{d2} = \frac{1}{2}\left(\Delta T_{wd2} - \frac{\Delta T_R \times \Delta T_{wd2}}{\Delta T_{wd2} + \Delta T_{wd1}}\right)c$$

wherein:
$\Delta T_{wd1}$ is a difference in propagation time between the terahertz radiation reflected from an outer boundary surface of the wall of the strand facing the receiver and from an inner boundary surface of the wall of the strand facing the receiver,
$\Delta T_{wd2}$ is a difference in propagation time between the terahertz radiation reflected from an inner boundary surface of the wall of the strand facing away from the receiver and from an outer boundary surface of the wall of the strand facing away from the receiver,
$\Delta T_R$ is a change in propagation time of the terahertz radiation emitted by the transmitter and received by the receiver after penetrating the strand, the change caused by a material of the strand, and
c is a propagation speed of the terahertz radiation in air.

\* \* \* \* \*